US008077587B2

(12) United States Patent
Kawasaki et al.

(10) Patent No.: US 8,077,587 B2
(45) Date of Patent: Dec. 13, 2011

(54) LASER ATTACHMENT DEVICE AND OPTICAL PICK-UP DEVICE USING THE SAME

(75) Inventors: Ryoichi Kawasaki, Isesaki (JP); Mitsuhiro Hashimoto, Ota (JP)

(73) Assignees: SANYO Electric Co., Ltd., Moriguchi-shi (JP); SANYO Optec Design Co., Ltd., Tokyo (JP)

( * ) Notice: Subject to any disclaimer, the term of this patent is extended or adjusted under 35 U.S.C. 154(b) by 0 days.

(21) Appl. No.: 13/034,417

(22) Filed: Feb. 24, 2011

(65) Prior Publication Data

US 2011/0211435 A1     Sep. 1, 2011

(30) Foreign Application Priority Data

Feb. 26, 2010   (JP) ................................. 2010-042999

(51) Int. Cl.
G11B 7/00 (2006.01)
(52) U.S. Cl. ...................................... 369/122; 369/44.12

(58) Field of Classification Search ............... 369/44.12, 369/44.14, 44.15, 116, 120, 121, 122; 372/36, 372/32, 43.01
See application file for complete search history.

(56) References Cited

U.S. PATENT DOCUMENTS 7,929,385 B2 * 4/2011 Fujiwara et al. ........... 369/44.22

FOREIGN PATENT DOCUMENTS

JP          5-81693          4/1993

* cited by examiner

*Primary Examiner* — Nabil Z Hindi
(74) *Attorney, Agent, or Firm* — Morrison & Foerster LLP (57) ABSTRACT

A laser attachment device of the present invention is formed of a LD package and a LD holder housing it. A first inner wall of the LD holder to come into contact with a side surface of the LD package is an inclined surface. This allows the facing direction of the LD package to be corrected by the first inner wall being the inclined surface, even when a laser beam emitted from a light emitting chip housed in the LD holder is inclined with respect to an optical axis. Thus, the traveling direction of the laser beam is corrected to the optical axis side.

6 Claims, 6 Drawing Sheets

LASER ATTACHMENT DEVICE AND OPTICAL PICK-UP DEVICE USING THE SAME

BACKGROUND OF THE INVENTION

1. Field of the Invention

The present invention relates to a laser attachment device which facilitates adjustment of luminance distribution of a laser beam, and to an optical pick-up device using the same.

2. Description of the Related Art

Figure 6:
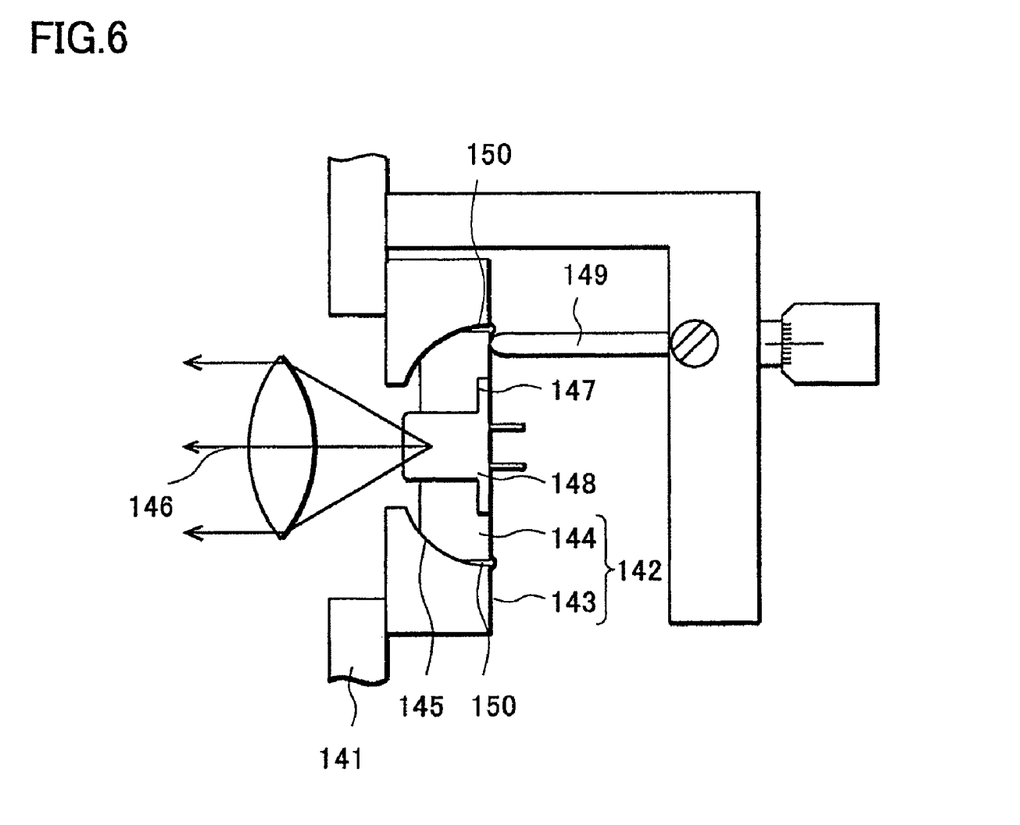
FIG. 6 is a cross-sectional view illustrating a laser attachment device according to a conventional embodiment.

As an embodiment of a conventional laser attachment device, a structure shown in FIG. 6 is known. As shown in the drawing, an optical axis adjustment mechanism part 142 is disposed on a base 141 of the laser attachment device. The optical axis adjustment mechanism part 142 is formed of a fixed seat 143 and a movable seat 144. An opening region 145 is formed in the fixed seat 143, and the inner surface of the opening region 145 is processed into a spherical surface centered at an optical axis 146 of an optical system. Meanwhile, the outer circumferential surface of the movable seat 144 is similarly processed into a spherical surface centered at the optical axis 146 of the optical system. A LD package 148 is disposed in close contact with a reference surface 147 of the movable seat 144, and the movable seat 144 is fitted into the opening region 145 of the fixed seat 143. Then, the position of the movable seat 144 is adjusted by an optical axis adjustment machine 149. Thus, the emitting direction of the laser beam emitted from the LD package 148 and the optical axis 146 of the optical system are adjusted. Displacement in luminance distribution of the laser beam on an objective lens (not shown) is also adjusted in a similar manner by the position adjustment of the movable seat 144. Note that, after the optical axis and the luminance distribution are adjusted, positional relationship between the fixed seat 143 and the movable seat 144 is fixed by an adhesive 150 (see for example, Japanese Patent Application Publication No. Hei 5-81693 pages 3 to 4, FIGS. 1 and 2).

As described above, in the conventional laser attachment device, the optical axis and the luminance distribution of the laser beam are adjusted by adjusting the position of the movable seat 144 for each of laser attachment devices after the optical axis adjustment mechanism part 142 is fixed to the base 141 of the laser attachment device. Accordingly, there are problems that the time required to attach and adjust the laser attachment device is difficult to reduce, working efficiency is poor, the laser attachment device is not suitable for mass production, and improvement in yield is difficult to achieve.

In addition, the adjustment of the laser beam requires fine movement of the movable seat 144 with respect to the fixed seat 143, and thus requires technique of a skilled worker. Accordingly, there is a problem of variation in adjustment accuracy depending on the skill of a worker.

The present invention is made in view of the above problems, and an object of the present invention is to provide a laser attachment device facilitating an adjustment work of a laser beam, and an optical pick-up device including the same.

SUMMARY OF THE INVENTION

A laser attachment device according to the present invention is a laser attachment device which is installed in a housing of an optical pick-up device and which emits a laser beam. The laser attachment device is characterized by including: a LD package having a light emitting chip built therein for emitting the laser beam, the LD package having a first side surface and a second side surface extending in a direction in which the laser beam is emitted; and a LD holder which has a shape of a frame body in which the LD package is housed and which has a first inner wall and a second inner wall inclined with respect to an optical axis of the optical pick-up device. The laser attachment device is characterized in that the first side surface of the LD package is brought into contact with any one of the first inner wall and the second inner wall of the LD holder, and the second side surface of the LD package is spaced away from the other one of the first inner wall and the second inner wall of the LD holder.

Further, an optical pick-up device according to the present invention is an optical pick-up device which irradiates an optical information recording medium with a laser beam and which detects the laser beam reflected by the optical information recording medium. The optical pick-up device is characterized by including the laser attachment device with the above configuration.

According to the present invention, the laser beam emitted from the LD package is easily corrected to the optical axis side of the optical pick-up device simply by bringing the side surface of the LD package into close contact with the inclined inner wall of the LD holder. Accordingly, a sophisticated adjustment work by a skilled worker as in the background art is no longer required. Thus, the cost required for manufacturing the laser attachment device and the optical pick-up device is reduced.

Moreover, according to the present invention, a direction to which the traveling direction of the laser beam is corrected can be made opposite by turning the LD holder upside down. Accordingly, a single type of LD holder can correct the LD package having the laser beam inclined to one side and the LD package having the laser beam inclined to the other side.

Furthermore, according to the present invention, the identification mark allowing the identification of the front surface and the back surface of the LD holder is provided on a side surface of the LD holder. This allows the state of the front surface and the back surface to be recognized properly when the LD package is installed to the LD holder, and thus the reduction in yield due to mistakenly recognizing the front and back surfaces is suppressed.

BRIEF DESCRIPTION OF THE DRAWINGS

FIGS. 4A to 4D are views showing a configuration of the laser attachment device according to the preferred embodiment of the invention in detail.

FIGS. 5A to 5C are views showing the laser attachment device with the LD holder turned upside down.

DESCRIPTION OF THE INVENTION

A description will be given below of a laser attachment device being a preferred embodiment of the invention and an optical pick-up device using the same.

Figure 1A:
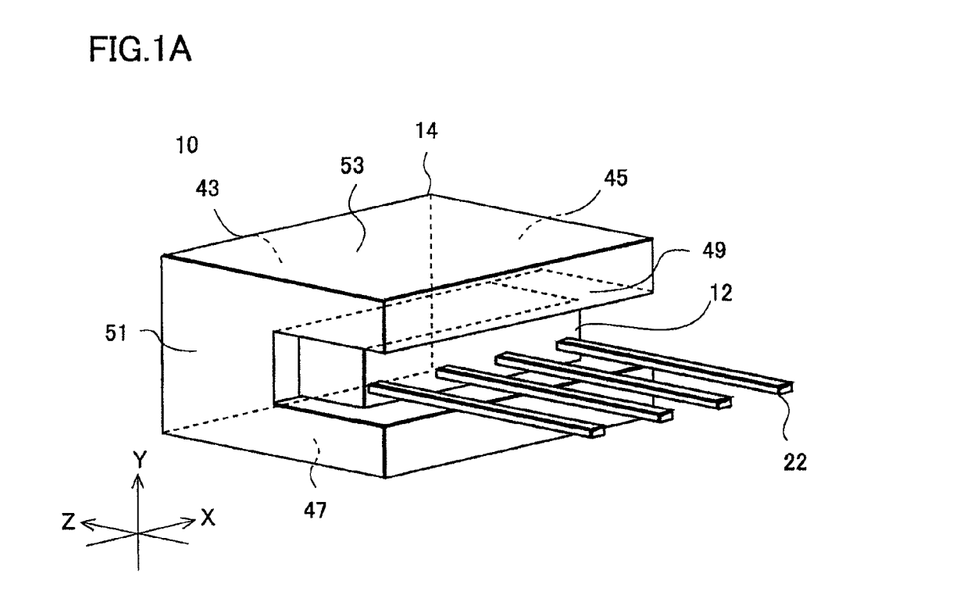
FIG. 1A is a perspective view showing a laser attachment device according to a preferred embodiment of the invention.
Figure 1B:
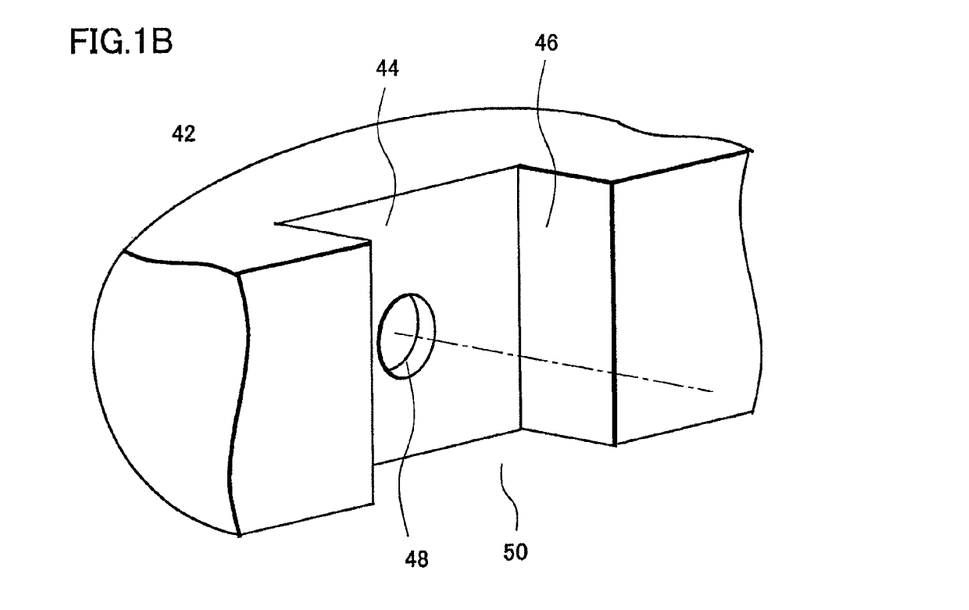
FIG. 1B is a perspective view showing a housing to which the laser attachment device is installed.

Firstly, a laser attachment device 10 of the embodiment and a housing 42 of an optical pick-up device to which the laser attachment device 10 is installed will be described with reference to FIGS. 1A and 1B. FIG. 1A is a perspective view showing an exterior of the laser attachment device 10, and FIG. 1B is a perspective view showing part of the housing 42 to which the laser attachment device 10 is installed.

As shown in FIG. 1A, the laser attachment device 10 is formed mainly of a LD holder 14 and a LD package 12 fixedly attached to the inside of the LD holder 14. Although not illustrated, a LD, a LD driver (LDD), and the like are disposed in the LD package 12, and a laser beam is emitted from the LD by causing the current to flow from the LDD to the LD. Although described in detail later, the laser beam emitted from the LD is focused on an optical information recording medium and is then reflected to write and read data into and from the optical information recording medium. Thus, the LD holder 2 is arranged in the housing 42 (see FIG. 1B) in such a manner that the emitting direction of the laser beam coincides with the optical axis of the optical pick-up device with high accuracy. Note that, the housing 42 refers to a package with optical system parts shown in FIG. 2 built in. For example, the LD holder 14 is disposed inside the housing 42, on the side surface of the housing 42, or the like.

In the following description, a X-axis direction in the drawings corresponds to a width direction of the housing 42 (width direction of the LD holder 14), a Y-axis direction in the drawings corresponds to a height direction of the housing 42 (height direction of the LD holder 14), and a Z-axis direction in the drawings corresponds to a length direction of the housing 42 (length direction of the LD holder 14). Note that, the Z-axis direction in the drawings coincides with the optical axis direction of the optical pick-up device.

In the embodiment, although the traveling direction of the laser beam emitted from the inside of the LD holder roughly coincides with the optical axis, the facing direction of the LD package 12 is corrected inside the LD holder 14 so that the traveling direction and the optical axis coincide with each other even more accurately. The specific configuration to achieve this correction will be described in detail with reference to FIGS. 4A to 5C.

An exterior shape of the LD holder 14 is a rectangular solid. Side surfaces 43 and 49 are reference surfaces in the XY direction with respect to the optical axis, and are perpendicular to an optical axis direction. Furthermore, side surfaces 51 and 45 are reference surfaces in the YZ direction with respect to the optical axis, and side surfaces 53 and 47 are reference surfaces in the XZ direction with respect to the optical axis. An internal space having a shape matching the LD package 12 is formed in the LD holder 14 to penetrate the LD holder 14 from the side surface 43 to the side surface 49 on the opposite side.

As shown in FIG. 1B, in a region of the housing 42 to which the LD holder 14 is attached, a recess portion 50 having a shape matching the exterior shape of the LD holder 14 is formed. In the recess portion 50, a side surface 44 is a reference surface in the XY direction with respect to the optical axis direction, and a side surface 46 is a reference surface in the YZ direction with respect to the optical axis direction. An opening portion 48 corresponding to a through-hole of the LD package 12 is formed in the side surface 44. As shown in a dash-dotted line, the center axis of the opening portion 48 coincides with the optical axis direction of the optical pick-up device. The laser beam emitted from the inside of the LD holder 14 travels through the opening portion 48, along the optical axis shown in the dash-dotted line.

A method of attaching the LD holder 14 to the housing 42 will be described. Firstly, the side surface 43 of the LD holder 14 is brought into contact with the side surface 44 of the housing 42, and the surfaces perpendicular to the optical axis direction of the optical pick-up device (reference surfaces in the XY direction) are fixed. Note that, at this time, the side surface 47 of the LD holder 14 comes into contact with a side surface of the housing 42, and the reference surfaces in the XZ direction are also fixed. Then, the LD holder 14 is moved in the X-axis direction, and the side surface 45 of the LD holder 14 is brought into contact with the side surface 46 of the housing 42. Thus, the reference surfaces in the YZ direction are fixed. Thereafter, the LD holder 14 is moved horizontally in the Z-axis direction, and is press fitted into the housing 42. Hence, the LD holder 14 is fixedly attached to the housing 42. The LD holder 14 and the housing 42 are designed so that the emitting direction of the laser beam emitted from the inside of the LD holder 14 coincides with the optical axis of the optical pick-up device by performing the above-described simple attachment work.

Figure 2:
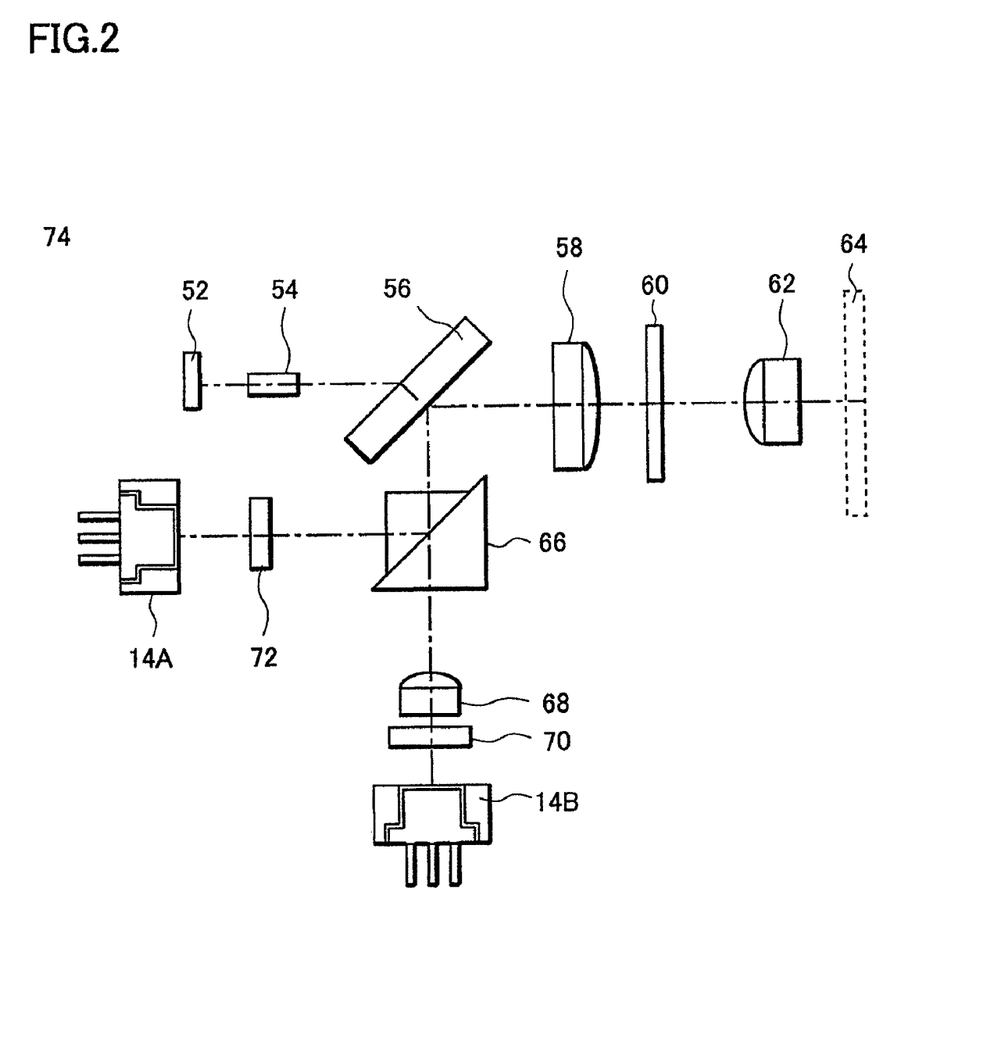
FIG. 2 is a schematic view showing an optical system of an optical pick-up device to which the laser attachment device according to the preferred embodiment of the invention is installed.

An optical system of an optical pick-up device 74 to which the laser attachment device 10 with the above configuration is installed will be described with reference to FIG. 2. A dash-dotted line in the drawing shows the optical axis of the optical pick-up device 74, and optical system parts described below are arranged accurately at their positions with respect to the optical axis.

A first LD holder 14A emits a laser beam of a first wavelength (blue-violet (blue) wavelength band of 400 nm to 420 nm (for example 405 nm)). A second LD holder 14B emits a laser beam of a second wavelength (red wavelength band of 645 nm to 675 nm (for example 655 nm)) and a laser beam of a third wavelength (infrared wavelength band of 765 nm to 805 nm (for example 785 nm)). Note that, the structure of the above-described LD holder 14 is applied to the first and second LD holders 14A and 14B. Here, only one LD holder may be provided, and the three laser beams described above may be emitted from this LD holder.

The above-described first wavelength laser beam is used, for example, to read or write data from or to a disc compliant with the Blu-ray Disc (BD) specification or the High-Definition Digital Versatile Disc (HD-DVD) specification, the second wavelength laser beam is used for a disc compliant with the Digital Versatile Disc (DVD) specification, and the third wavelength laser beam is used for a disc compliant with the Compact Disc (CD) specification.

A first diffraction grating 72 is disposed between the first LD holder 14A and a polarization beam splitter 66, and the laser beam emitted from the first LD holder 14A enters the first diffraction grating 72. The first diffraction grating 72 is formed of a diffraction grating which splits the entering laser beam into a zero-order beam, a positive first order diffracted beam, and a negative first order diffracted beam, and a half-wave plate which changes the entering laser beam into a linearly polarized beam with S-polarization with respect to the polarization plane of the polarization beam splitter 66. Likewise, a second diffraction grating 70 is disposed between the second LD holder 14B and the polarization beam splitter 66, and is formed of a diffraction grating and a half-wave plate. Note that, in the second diffraction grating 70, the entering laser beam is changed into a linearly polarized beam with P-polarization with respect to the polarization plane of the polarization beam splitter 66.

A coupling lens 68 is arranged between the second diffraction grating 70 and the polarization beam splitter 66, and changes the divergence angle of the entering laser beam. Use of the coupling lens 68 allows a collimating lens 58 and an objective lens 62 to be used commonly for multiple laser beams.

The polarization beam splitter 66 reflects the laser beam with S-polarization entering from the first diffraction grating 72, and transmits the laser beam with P-polarization entering from the coupling lens 68.

A semitransparent mirror 56 reflects, toward the collimating lens 58, the laser beam with S-polarization which is reflected by the polarization beam splitter 66 and then enters the semitransparent mirror 56 and the laser beam with P-polarization which is transmitted through the polarization beam splitter 66 and then enters the semitransparent mirror 56. Moreover, the semitransparent mirror 56 transmits returning beams of the laser beams, the returning beams entering from the collimating lens 58. The collimating lens 58 changes the laser beams entering from the semitransparent mirror 56 into collimated beams. The laser beams changed into the collimated beams by the collimating lens 58 enter a quarter-wave plate 60.

The quarter-wave plate 60 changes the laser beams entering from the collimating lens 58 from linearly polarized beams to circularly polarized beams. In addition, the quarter-wave plate 60 changes returning beams of the laser beams from circularly polarized beams to linearly polarized beams, the returning beams entering from the objective lens 62. Then, the objective lens 62 focuses the laser beams entering from the quarter-wave plate 60 onto respective corresponding signal recording layers of an optical information recording medium 64.

Returning beams of the laser beams reflected by the optical information recording medium 64 are changed into collimated beams by the objective lens 62, enter the quarter-wave plate 60, and are changed from circularly polarized beams to linearly polarized beams by the quarter-wave plate 60. Thereafter, the returning beams of the laser beams which are changed into linearly polarized beams are transmitted through the collimating lens 58, transmitted through the semitransparent mirror 56, and then enter a detection lens 54.

The detection lens 54 focuses the returning beams of the laser beams on an optical detector 52, and also causes astigmatism in the returning beams of the laser beams to generate a focus error signal. Then, the optical detector 52 performs photoelectric conversion of the received returning beams of the laser beams.

That is the configuration of the optical pick-up device 74.

Properties of the laser beam emitted from the LD package 12 will be described with reference to FIG. 3.

Figure 3A:
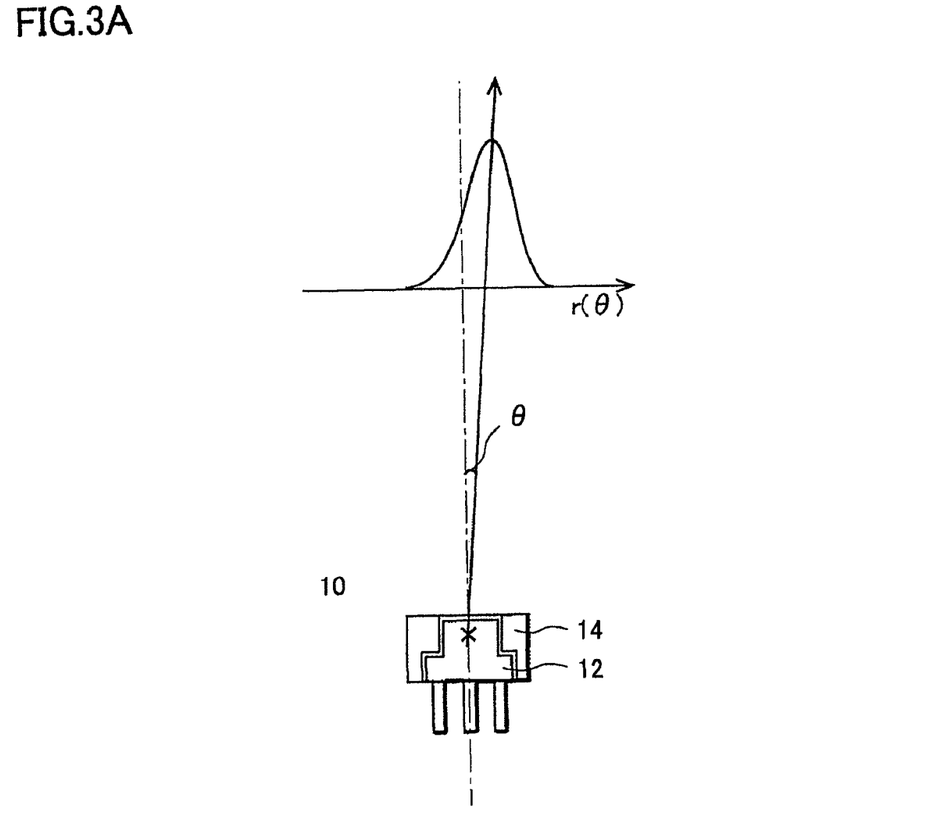
FIG. 3A is a view illustrating a luminance distribution of a laser beam of the optical pick-up device according to the preferred embodiment of the invention.

As shown in FIG. 3A, the laser beam emitted from the inside of the LD package 12 travels along the optical axis of the optical pick-up device, the optical axis shown in a dash-dotted line. However, there are some cases where the luminance center of the laser beam is slightly inclined with respect to the optical axis. The reason for this inclination is thought to be due to the thickness and the unevenness of adhesive used to fixedly attach the LD in the LD package 12. Furthermore, since the laser beam emitted from the inside of the LD package 12 is focused on the optical information recording medium 64 by the objective lens 62, variation in luminance center of the laser beam may cause deterioration in focusing accuracy of the objective lens 62. Such case will be described below by using the positive direction and negative direction in the X-axis direction on the XY plane perpendicular to the optical axis, where $r(\theta)$ represents an angle by which the luminance center of the laser beam is displaced with respect to the optical axis.

Figure 3B:
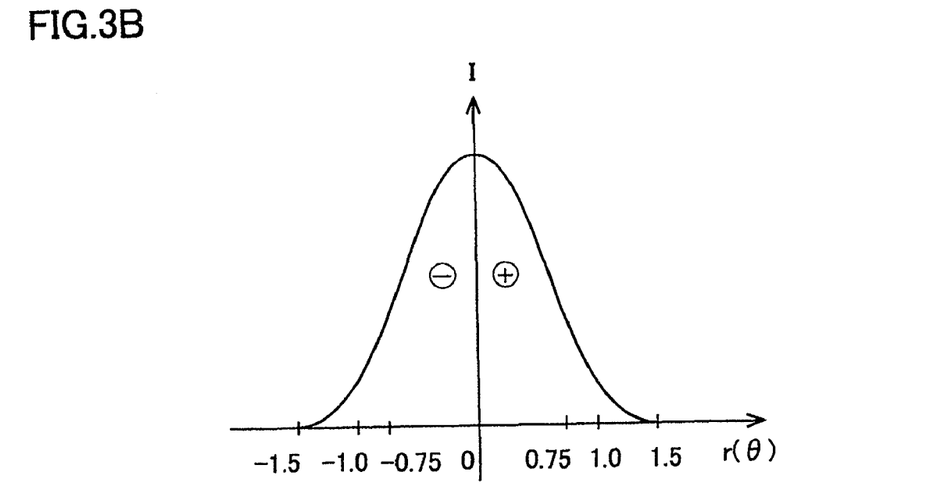
FIG. 3B is a view illustrating a variation in the luminance distribution.

Firstly, as shown in FIG. 3B, when the variation in luminance center of the laser beam emitted from the inside of the LD package 12 is within a range of $-1.5° \leq r(\theta) \leq 1.5°$, there is hardly no effect on focusing accuracy, and is within a range of allowable error. Thus, such LD package 12 is graded as non-defective. Then, the LD package 12 thus graded as being within the range of allowable error is sorted as being either the LD package 12 whose luminance center is inclined in the negative direction (for example, $-1.5° \leq r(\theta) \leq 0°$) with respect to the optical axis (first LD package) or the LD package 12 whose luminance center is inclined in the positive direction (for example, $0° \leq r(") \leq 1.5°$) with respect to the optical axis (second LD package).

Since the direction to which the laser beam is inclined is opposite in the first LD package and the second LD package, a direction to which the laser beam is to be corrected is also opposite. In this embodiment, when housing the second LD package, the state of the LD holder housing the LD package is turned upside down from the state when housing the first LD package. Thus, the laser beams emitted from both LD packages are corrected to the optical axis side.

Figure 4A:
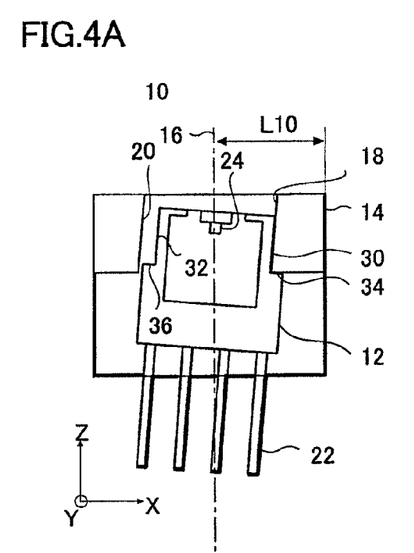
FIG. 4A is a plan view.
Figure 4B:
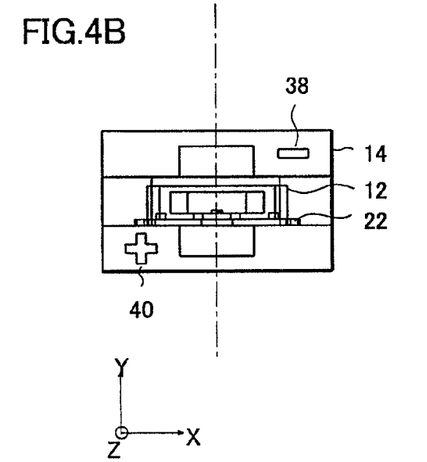
FIG. 4B is a side view.
Figure 4C:
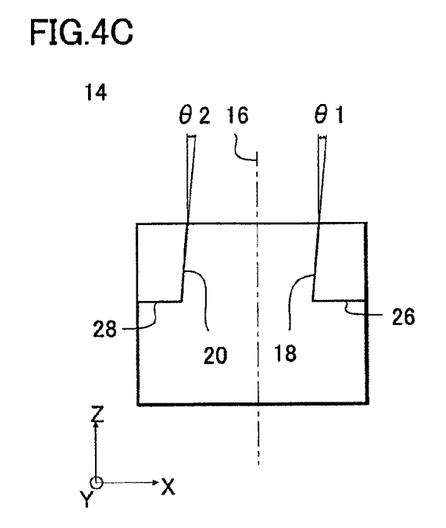
FIG. 4C is a plan view showing a LD holder.
Figure 4D:
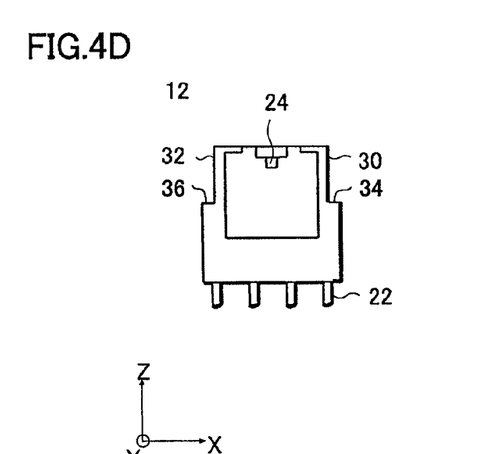
FIG. 4D is a plan view showing a LD package.

FIGS. 4A to 4D show a structure for housing the above-described first LD package in the LD holder 14. FIG. 4A is a plan view showing the configuration of the laser attachment device 10. FIG. 4B is a view of the laser attachment device 10 shown in FIG. 4A viewed in a positive Z direction. FIG. 4C is a plan view showing the LD holder 14. FIG. 4D is a plan view showing the LD package 12.

As shown in FIG. 4A, the laser attachment device 10 according to the embodiment includes the LD package 12 in which a light emitting chip 24 (LD) is packaged and the LD holder 14 with the LD package 12 built in.

The LD package 12 is a so-called lead frame package. The light emitting chip 24 emitting a laser beam is connected to a lead frame in the LD package 12, and part of this lead frame is led out downward in the drawing as a terminal portion 22. The light emitting chip 24 is protected by a case member made by injection molding a resin into a predetermined shape. A surface of the case member through which the laser beam is emitted from the light emitting chip 24 is not sealed but is opened to the outside. Here, the light emitting chip 24 may be sealed by a transparent resin, or an end surface thereof from which the laser beam is emitted may be sealed by a glass plate.

As is apparent from FIG. 4A, the center axis of the LD package 12 does not coincide with the optical axis 16 of the optical pick-up device, but is inclined relative thereto. This allows the traveling direction of the laser beam emitted from the light emitting chip 24 to be corrected to the positive side (optical axis 16 side) even if the laser beam is inclined to the negative side with respect to the optical axis 16.

As shown in FIG. 4D, the LD package 12 includes a first side surface 30 and a second side surface 32 at positions near a leading end portion in which the light emitting chip 24 is mounted. The first side surface 30 and the second side surface 32 are formed parallel to the center line (optical axis) of the LD package 12. When the LD package 12 is housed in the LD holder 14, the first side surface 30 comes into close contact with the inner wall of the LD holder 14. Meanwhile, a side surface of the LD package 12 which is not in close contact with the inner wall of the LD holder 14 is spaced apart from the inner wall of the LD holder 14.

A first abutting portion 34 and a second abutting portion 36 are side surfaces forming a right angle with the first side surface 30 and the second side surface 32, respectively, and are used to fix the LD package 12 in a predetermined position with respect to the Z axis when the LD package 12 is housed in the LD holder 14. Specifically, the first abutting portion 34 of the LD package 12 abuts on a first abutting portion 26 of the LD holder 14 shown in FIG. 4C.

The light emitting chip 24 built into the LD package 12 may emit a laser beam of one wavelength band or multiple types of laser beams of different wavelengths. The wavelength bands of the laser beams emitted from the light emitting chip 24 are as described above.

Furthermore, when multiple laser beams with different wavelengths are emitted from the LD package 12, a single light emitting chip 24 having multiple light emitting sources may be built into the LD package 12, or multiple light emitting chips 24 may be built thereinto. For example, a first light emitting chip emitting the first laser beam and a second light emitting chip emitting the second and third laser beams may be built into the LD package 12.

The LD holder 14 is formed by, for example, injection molding a metal such as magnesium or a resin such as epoxy resin into a frame shape as shown in FIG. 4C, and is fixedly attached to the housing of the optical pick-up device while holding the LD package 12 (see FIG. 1). Here, a structure for attaching the LD holder 14 to the housing in the case shown in FIGS. 4A to 4D is the same as in the case shown in FIGS. 5A to 5C which will be described later.

A first inner wall 18 and a second inner wall 20 are provided on the inner side of the LD holder 14. These inner walls come into contact with the outer side surfaces of the LD package 12 housed in the LD holder 14. In a general LD holder 14, when the center line of the LD holder 14 is made to coincide with the optical axis 16, the inner walls thereof are parallel to the optical axis 16. However, in this embodiment, the first inner wall 18 and the second inner wall 20 are inclined with respect to the optical axis 16.

Specifically, an angle $\theta 1$ by which the first inner wall 18 is inclined with respect to the optical axis in a plan view is set to, for example, 0.5°. Thus, as shown in FIG. 4A, when the first side surface 30 of the LD package comes into contact with the first inner wall 18 of the LD holder 14, the traveling direction of the laser beam emitted from the light emitting chip 24 is adjusted by 0.5° to the positive side. As a result, a variation in luminance center of the laser beam emitted from the LD package 12 is adjusted to be within a range of $-1.0° \leq r (\theta) \leq 0.5°$. Hence, the LD package 12 is fixedly attached to the inside of the LD holder 14 with the variation thereof within a range more accurate than the range of allowable error ($-1.5° \leq r (\theta) \leq 1.5°$) to be graded as being non-defective.

Note that, in the drawings, the inclination of the first inner wall 18 is shown with a degree which is visibly apparent in order to clearly show the characteristic. However, the first inner wall 18 provided in an actual laser attachment device is inclined at such a small angle that the inclination is difficult to recognize visually.

The second inner wall 20 is also formed into a similar inclined surface, and an angle $\theta 2$ by which the second inner wall 20 is inclined with respect to the optical axis 16 is set equal to $\theta 1$ described above.

The first inner wall 18 and the second inner wall 20 are in a relation of 180° rotational symmetry about a point being a rotational center existing between the two. Furthermore, the two inner walls are also in a relation of point symmetry. Such configuration causes the first inner wall 18 and the second inner wall 20 to be inclined in the opposite direction with respect to the optical axis 16 by turning the LD holder 14 upside down. As a result, a direction to which the LD package 12 built into the LD holder 14 is inclined can be made opposite. This matter will be described in detail later with reference to FIGS. 5A to 5C.

As shown in FIG. 4B, on an end surface of the LD holder 14 on the negative Z side, a first identification mark 38 and a second identification mark 40 are provided. These marks may be provided as protruding portions or recess portions when the LD holder 14 is formed by injection molding, or may be marks made by paint visually recognizable. Moreover, the identification marks may be formed by laser irradiation.

The first identification mark 38 is provided near the right upper end portion of the end surface of the LD holder 14, and has a shape of "−". Meanwhile, the second identification mark 40 is arranged at a diagonal position to the first identification mark 38, and has a shape of "+". Provision of the identification marks on the end surface of the LD holder 14 in such a manner allows the front side and the back side of the LD holder 14 to be recognized simply by checking the identification marks. In other words, the direction to which the first inner wall 18 shown in FIG. 4C is inclined can be recognized easily by checking the first identification mark 38 or the second identification mark 40 provided on the end surface of the LD holder 14. Accordingly, errors in attachment direction of the LD holder 14 can be reduced, and yield is improved.

Symbols and letters other than those described above can be used as the shapes of the first identification mark 38 and the second identification mark 40 as long as the difference of marks can be identified.

As shown in FIG. 4A, a distance L10 between a light emitting source of the light emitting chip 24 built into the LD package 12 and an end portion of the LD holder 14 on the positive X side is set to a predetermined distance. This distance is also set to the same value in a state where the LD holder 14 is turned upside down (state shown in FIGS. 5A to 5C). The above settings allow the light emitting point of the light emitting chip 24 to be disposed on the optical axis 16 regardless of whether the LD holder 14 is turned upside down or not.

Figure 5A:
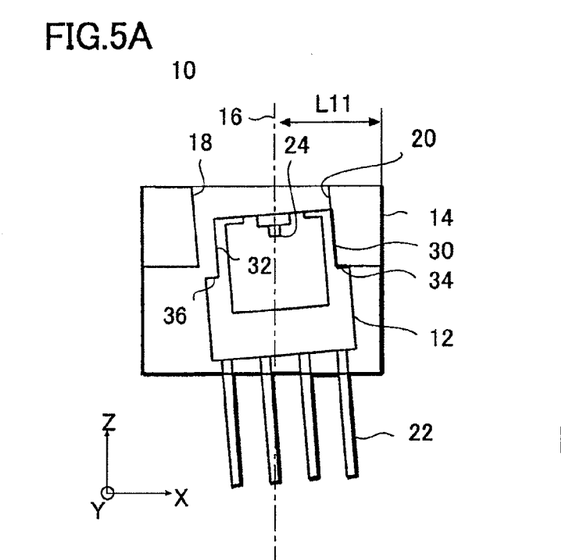
FIG. 5A is a plan view.
Figure 5B:
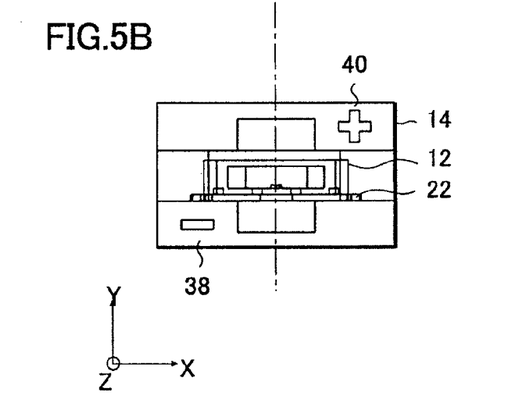
FIG. 5B is a side view.
Figure 5C:
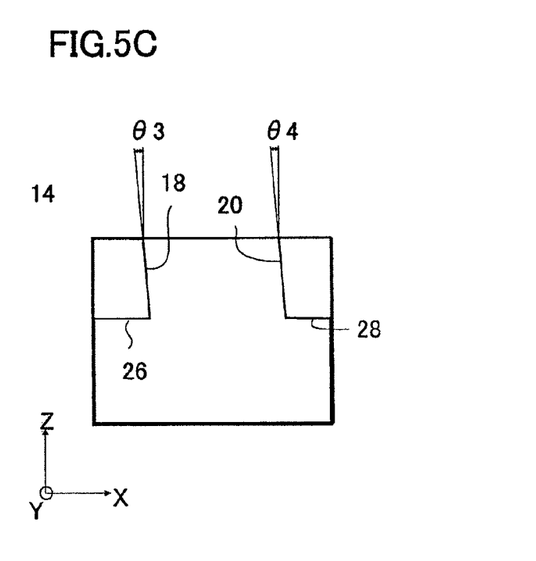
FIG. 5C is a plan view of the LD holder turned upside down.

With reference to FIGS. 5A to 5C, a description will be given of a configuration of housing, into the LD holder 14 turned upside down, the second LD package whose laser beam is inclined to the positive direction with respect to the optical axis. FIG. 5A is a plan view showing the laser attachment device 10 in this state. FIG. 5B is a view of the laser attachment device 10 in the state of FIG. 5A viewed in the positive Z direction. FIG. 5C is a plan view of the LD holder 14 turned upside down. A structure disclosed here causes the laser beam which is emitted from the light emitting chip 24 while being inclined to the positive side to be corrected to the negative X side.

As shown in FIG. 5A, when the LD holder 14 is turned upside down, the second inner wall 20 is disposed on the right side of the LD holder 14 and the first inner wall 18 is disposed on the left side thereof. Moreover, the direction to which the first inner wall 18 and the second inner wall 20 of the LD holder 14 are inclined is opposite to the case of FIG. 4A. Meanwhile, the LD package 12 is not turned over and left as it is.

In this state, the LD package 12 is housed in the LD holder 14, and the first side surface 30 of the LD package 12 is brought into contact with the second inner wall 20 of the LD holder 14 so that the LD holder 14 is fixed. In this way, the LD package 12 is fixedly attached to an inner portion of the LD holder 14 with its center axis inclined with respect to the optical axis 16.

Meanwhile, the second side surface 32 of the LD package 12 is not in contact with the first inner wall 18 of the LD holder 14, and a gap exists between the two. The existence of the gap allows the LD package 12 to be inclined in the LD holder 14, even if the LD holder 14 is turned upside down or not.

As shown in the drawings, the LD package 12 is inclined to the negative X side by using the second inner wall 20 of the LD holder 14, and thus the luminance center of the laser beam is corrected to the negative X side.

Furthermore, even when the LD holder 14 is turned upside down, a distance L11 between the light emitting point of the light emitting chip 24 built into the LD package 12 and the right end portion of the LD holder 14 is the same as in the case shown in FIG. 4A (L10). In other words, the light emitting point from which the laser beam is emitted from the light emitting chip 24 is disposed on the optical axis 16 also in the case shown in these drawings.

As shown in FIG. 5B, by turning the LD holder 14 upside down, the second identification mark 40 is located near the right upper end portion of the LD holder 14 in the drawing, and the first identification mark 38 is located near the left lower end portion in the drawing. Thus turning the LD holder 14 upside down interchanges the positions of the first identification mark 38 and the second identification mark 40.

As shown in FIG. 5C, the direction to which the first inner wall 18 and the second inner wall 20 are inclined is also made opposite. Moreover, an angle θ3 and an angle θ4 by which the first inner wall 18 and the second inner wall 20 are inclined with respect to the optical axis are the same as θ1 and θ2 shown in FIG. 1. The angle in which the laser beam emitted from the light emitting chip 24 travels is corrected by these angles.

By the above configuration, when coming into contact with the second inner wall 20 of the LD holder 14, the LD package 12 having a displacement in the positive direction (for example, $0° \leq r(\theta) \leq 1.5°$) is fixedly bonded to the inside of the LD holder 14 while being inclined in the negative direction in the LD holder 14. Thus, the inclination is adjusted by 0.5° in the negative direction, and the variation in luminance center of the laser beam of the LD package 12 is adjusted to be within a range of $-0.5° \leq r(\theta) \leq 1.0°$). Hence, the LD package 12 is fixedly attached to the inside of the LD holder 14 with the variation thereof within a range more accurate than the range of allowable error ($-1.5° \leq r(\theta) \leq 1.5°$) to be graded as being non-defective.

As shown in FIG. 4A, the present embodiment is characterized in that the first inner wall 18 inclined with respect to the optical axis 16 is provided in the LD holder 14 housing the LD package 12.

Specifically, the laser beam emitted from the light emitting chip 24 built into the LD package 12 has its luminance distribution displaced with respect to the optical axis 16. In FIG. 4A, the center of the luminance distribution of the laser beam emitted from the light emitting chip 24 is displaced to the left side (negative direction) of the optical axis 16 in the drawing. Accordingly, if the first inner wall 18 and the second inner wall 20 of the LD holder 14 are formed parallel to the optical axis 16 and the LD package 12 is fitted to a space formed between these inner walls, although the center line of the LD package 12 coincides with the optical axis 16, the traveling direction of the laser beam emitted from the light emitting chip 24 is displaced slightly to the left side of the optical axis 16.

To counter this, in the present embodiment, the first inner wall 18 of the LD holder 14 is formed as an inclined surface, and the first side surface 30 of the LD package 12 is brought into contact with the inclined first inner wall 18. This allows the entire LD package 12 to be inclined as similar to the first inner wall 18 of the LD holder 14. Accordingly, the traveling direction of the laser beam emitted from the light emitting chip 24 built into the LD package 12 can be adjusted to the optical axis 16 side.

As shown FIG. 4A, the preferred embodiment of the invention is further characterized in that a distance by which the first inner wall 18 and the second inner wall 20 of the LD holder 14 are set apart is set larger than the width of the LD package 12 to be housed in the LD holder 14. This allows the LD package 12 to be inclined in the LD holder 14.

The preferred embodiment of the invention is also characterized in that the LD holder 14 is turned upside down and used in the laser attachment device 10 in accordance with the inclination in the traveling direction of the laser beam emitted from the light emitting chip 24. Specifically, as shown in FIG. 4A, when the laser beam emitted from the light emitting chip 24 is inclined to the negative X direction, the LD holder 14 is arranged so that the first inner wall 18 of the LD holder 14 is inclined to the right side (positive side). Then the LD package 12 is housed inside the LD holder 14 in this state, and is fixedly attached to the LD holder 14 while the first side surface 30 of the LD package 12 is brought into contact with the first inner wall 18 of the LD holder 14. This causes the LD package 12 to be inclined by a predetermined angle in the positive X direction, and thus the traveling direction of the laser beam emitted from the light emitting chip 24 is corrected to the optical axis 16 side.

Meanwhile, as shown in FIG. 5A, when the laser beam emitted from the light emitting chip 24 is inclined to the positive X direction, the LD holder 14 is turned upside down from the state shown in FIG. 4A, and the first side surface 30 of the LD package 12 is brought into close contact with the second inner wall 20 of the LD holder 14. This causes the LD package 12 to be inclined in the negative X direction, and thus the laser beam emitted from the light emitting chip 24 is corrected to the optical axis 16 side.

As described above, even when the laser beam emitted from the light emitting chip 24 is inclined to the positive X side or the negative X side, the single type of LD holder 14 including therein the inner walls inclined by a predetermined angle can be used to correct the traveling direction of the laser beam in either direction by turning the LD holder 14 upside down or not.

What is claimed is:

1. A laser attachment device which is installed in a housing of an optical pick-up device and which emits a laser beam, the laser attachment device comprising:
   a LD package having a light emitting chip built therein for emitting the laser beam, the LD package having a first side surface and a second side surface extending in a direction in which the laser beam is emitted; and
   a LD holder which has a shape of a frame body in which the LD package is housed and which has a first inner wall and a second inner wall inclined with respect to an optical axis of the optical pick-up device, wherein
   the first side surface of the LD package is brought into contact with any one of the first inner wall and the second inner wall of the LD holder, and
   the second side surface of the LD package is spaced away from the other one of the first inner wall and the second inner wall of the LD holder.

2. The laser attachment device according to claim 1, wherein the first inner wall and the second inner wall of the LD holder are inclined with respect to the optical axis respectively at angles substantially the same.

3. The laser attachment device according to claim 1, wherein the LD package is either one of a first LD package having the laser beam emitted therefrom inclined to one side with respect to the optical axis and a second LD package having the laser beam emitted therefrom inclined to the other side with respect to the optical axis, and a state of the LD holder with the second LD package used as the LD package is turned upside down from a state of the LD holder with the first LD package used as the LD package, and thereby a traveling direction of the laser beam emitted from the LD package is corrected to the optical axis side in both cases.

4. The laser attachment device according to claim 1, wherein an identification mark allowing identification of a facing direction of a main surface of the LD holder is provided on a side surface of the LD holder.

5. The laser attachment device according to claim 4, wherein the identification mark includes a first identification mark provided at a corner portion of the side surface on which the identification mark is provided and a second identification mark which is provided in a corner portion opposite to the corner portion provided with the first identification mark and which has a different shape from the first identification mark.

6. An optical pick-up device which irradiates an optical information recording medium with a laser beam and which detects the laser beam reflected by the optical information recording medium, the optical pick-up device comprising the laser attachment device according to claim 1.

\* \* \* \* \*